United States Patent
Beckers

(10) Patent No.: US 7,182,516 B2
(45) Date of Patent: Feb. 27, 2007

(54) HYDRODYNAMIC BEARING SYSTEM FOR THE ROTARY BEARING OF A SPINDLE MOTOR

(75) Inventor: Roland Beckers, Lauffen (DE)

(73) Assignee: Minebea Co. Ltd., Nagano-Ken (JP)

( * ) Notice: Subject to any disclaimer, the term of this patent is extended or adjusted under 35 U.S.C. 154(b) by 68 days.

(21) Appl. No.: 11/078,697

(22) Filed: Mar. 14, 2005

(65) Prior Publication Data

US 2005/0213857 A1   Sep. 29, 2005

(30) Foreign Application Priority Data

Mar. 12, 2004   (DE)   .................. 20 2004 003 695 U

(51) Int. Cl.
*F16C 32/06* (2006.01)

(52) U.S. Cl. .................................... 384/107

(58) Field of Classification Search ................ 384/100, 384/107, 113, 114; 310/90; 360/99.08, 98.07
See application file for complete search history.

(56) References Cited

U.S. PATENT DOCUMENTS

| | | | |
|---|---|---|---|
| 5,112,141 A * | 5/1992 | Asada et al. ................ 384/100 |
| 5,598,048 A | 1/1997 | Dunfield et al. | |
| 5,855,436 A | 1/1999 | Eum et al. | |
| 6,127,756 A | 10/2000 | Iwaki et al. | |
| 6,250,808 B1 | 6/2001 | Ichiyama | |
| 6,592,262 B2 | 7/2003 | Rahman | |
| 6,815,850 B2 * | 11/2004 | Albrecht et al. ............... 310/90 |
| 6,900,567 B2 * | 5/2005 | Aiello et al. ................... 310/90 |
| 2001/0000073 A1 * | 3/2001 | Kobayashi et al. ......... 384/100 |
| 2003/0230944 A1 | 12/2003 | Aiello | |

* cited by examiner

*Primary Examiner*—Thomas R. Hannon
(74) *Attorney, Agent, or Firm*—Browdy and Neimark, PLLC

(57) ABSTRACT

The invention relates to a hydrodynamic bearing system for the rotary bearing of a spindle motor particularly to drive the platter(s) in a hard disk drive having a stationary shaft, a bearing sleeve journaled to be rotatable about the axis of the shaft and a cover plate fixedly attached to the bearing sleeve to cover the bearing sleeve in the region of the free end of the shaft, the surfaces of the shaft, the bearing sleeve and the cover plate facing each other and spaced apart from each other by a bearing gap forming at least one radial bearing region and at least one axial bearing region.

The invention is characterized in that the cover plate has a cylinder-shaped shoulder concentric to the axis and having a thread to receive a fastening screw which is rotatably accommodated in a recess in the end face of the shaft in such a way that the bearing gap continues between the inner surface of the recess and the outer surface of the shoulder.

6 Claims, 2 Drawing Sheets

HYDRODYNAMIC BEARING SYSTEM FOR THE ROTARY BEARING OF A SPINDLE MOTOR

BACKGROUND OF THE INVENTION

The invention relates to a hydrodynamic bearing system particularly for the rotary bearing of a spindle motor to drive, for example, the platter(s) in a hard disk drive according to the preamble of patent claim 1.

PRIOR ART

Spindle motors essentially consist of a stator, a rotor and at least one bearing system arranged between these two. The electrically driven rotor is rotatably supported with respect to the stator by means of the bearing system. One possibility is to use hydrodynamic bearing systems as the bearing system.

A known embodiment of a hydrodynamic bearing system comprises a bearing sleeve and a shaft which is arranged within an axial bore in the bearing sleeve. The shaft rotates freely within the bearing sleeve and forms a radial bearing together with the bearing sleeve. The mutually interacting surfaces of the shaft and sleeve are kept apart from each other by a thin, concentric, lubricant-filled bearing gap.

A surface structure is formed on at least one of the bearing surfaces which, due to the relative rotary movement, exerts local accelerating forces on the lubricant located in the bearing gap. A kind of pumping action is generated in this way resulting in the formation of a homogeneous lubricating film of regular thickness which is stabilized by means of hydrodynamic pressure zones.

Displacement along the rotational axis is prevented by at least one appropriately designed hydrodynamic axial bearing. In a hydrodynamic axial bearing, the bearing surfaces mutually interacting with each other, of which at least one is provided with a surface structure, are each arranged on a plane perpendicular to the rotational axis and are spaced axially apart from each other by a thin, preferably even, lubricant-filled bearing gap. The hydrodynamic thrust bearings provided to take on axial loads are preferably formed by the two end faces of a thrust plate arranged at the end of the shaft, one of the end faces of the disk being associated with a corresponding end face of the sleeve and the other end face being associated with the inside end face of a cover plate. The cover plate thus forms a counter bearing to the thrust plate and seals the entire bearing system from below, preventing air from penetrating into the bearing gap filled with lubricant.

In another embodiment of the bearing system, the shaft is fixedly arranged in a baseplate and enclosed by the bearing sleeve which rotates about the shaft. The bearing sleeve in turn carries a rotor hub on which, for example, the platters of a hard disk drive are disposed. As a rule, the cover plate forming the counter bearing to the thrust plate takes the form of a flat disk. For these types of hard disk drives having stationary shafts, it is not possible to use a central fastening screw, as needed, for example, in 2.5" disk drives to fix the platter(s) onto the rotor hub, since the cover plate is not thick enough to receive a screw.

A hydrodynamic bearing system having a thrust plate arranged on one side and a rotatably supported shaft with a central fastening screw has been revealed, for example in U.S. Pat. No. 6,183,135 B1. The thrust plate is accommodated in a first recess in the bearing sleeve made to fit the dimensions of the thrust plate, and is covered by a cover plate which is arranged in a second recess having a larger diameter. The larger diameter of the second recess produces a step within the bearing sleeve which is used as an axial stop for the cover plate.

U.S. Pat. No. 5,598,048 A reveals a bearing system having radial bearing regions and axial bearings in which a central thread to fix the platters onto the rotor, as required in the above invention, is not provided. Both the baseplate having a stationary shaft as well as the rotor hub having an integrated cover plate are each designed as an integral piece. Furthermore, here the axial bearing takes the form of a "pivot bearing" and not a non-contact hydrodynamic bearing.

SUMMARY OF THE INVENTION

The object of the invention is to improve a hydrodynamic bearing system for spindle motors in such a way that the use of a central fastening screw in combination with a stationary shaft is made possible.

This object has been achieved according to the invention by the characteristics outlined in patent claim 1.

Further preferred and beneficial embodiments of the invention are revealed in the subordinate claims.

According to the invention, the cover plate has a cylinder-shaped shoulder concentric to the rotational axis which is rotatably accommodated in a recess in the end face of the shaft in such a way that the bearing gap continues between the inside surface of the recess and the outer surface of the shoulder. This makes it possible to provide a central thread in the cover plate whose purpose is to receive a fastening screw, a substantial part of the thread running within the cylindrical shoulder.

In accordance with a preferred embodiment of the invention, provision is made for the cover plate to be accommodated in a recess in the bearing sleeve so that the bearing sleeve and the cover plate form one plane. In a further development of the invention, provision can be made for the rotor hub and the bearing sleeve to be designed as a single piece, in other words for the bearing sleeve to form an integral component of the rotor hub.

According to the invention, the cover plate with the shoulder—together with corresponding parts of the shaft—can be designed as a functional part of the hydrodynamic bearing system. For this purpose, regions of the inner surface of the recess and/or regions of the outer surface of the shoulder are provided with surface structures and thus form a radial bearing region and/or an axial bearing region. This embodiment of the invention helps to stabilize and increase the stiffness of the bearing in a beneficial way.

In a further preferred embodiment, the shaft can have a step that is divided into a section having a larger diameter and a section having a smaller diameter. Here, the bore in the shaft is provided at the end face of the section which has the larger shaft diameter.

In a corresponding way, the bearing sleeve can also have a step that is divided into a section having a larger inside diameter and a section having a smaller inside diameter. The step in the bearing sleeve is separated by a bearing gap from the step in the shaft located opposite.

The steps can be used in a beneficial manner to form an additional axial bearing region in that at least one of the opposing surfaces of the two steps is provided with a surface structure.

BRIEF DESCRIPTION OF THE DRAWINGS

An embodiment of the invention is described in more detail below on the basis of the drawings. Further characteristics, advantages and applications of the invention can be derived from the drawings and their description. The drawings show.

DESCRIPTION OF PREFERRED EMBODIMENTS OF THE INVENTION

Figure 1:
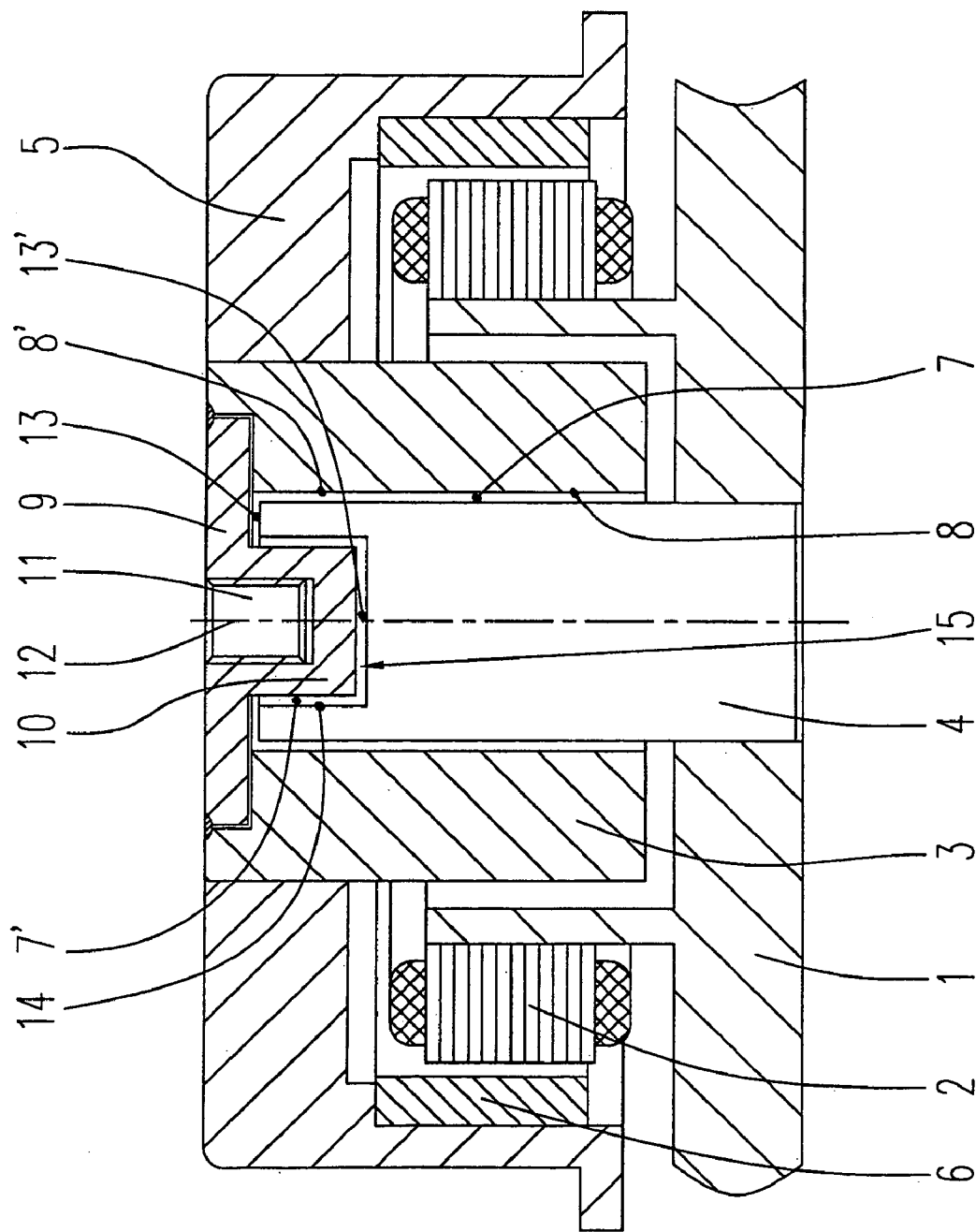
FIG. 1: a schematic sectional view of a spindle motor having a first embodiment of the bearing system according to the invention.

The embodiment according to FIG. 1 shows a spindle motor to drive a hard disk drive having a hydrodynamic bearing system according to the invention. In the illustrated embodiment, a stationary shaft is enclosed by a rotatable bearing sleeve carrying the rotor.

The spindle motor comprises a stationary baseplate 1 on which a stator arrangement 2, consisting of a stator core and windings, is arranged. A shaft 4 is firmly accommodated in a recess in the baseplate 1 and enclosed by a bearing sleeve 3 having a cylindrical axial bore. The bearing sleeve 3 carries a rotor hub 5 on which one or more platters (not illustrated) of the hard disk drive are disposed and fixed with a fastening screw. An annular permanent magnet 6 having a plurality of pole pairs is arranged on the lower inside edge of the rotor hub 5, an alternating electrical field being applied to the pole pairs by a stator arrangement 2 spaced apart from them by means of an air gap, so that the rotor 5, together with the bearing sleeve 3, is put into rotation.

A bearing gap 7 remains between the inside diameter of the bearing sleeve 3 and the outside diameter of the shaft 4, the bearing gap 7 being filled with a lubricant. The hydrodynamic bearing system is formed in a well-known method by using two radial bearing regions 8, 8', not illustrated in detail here, that are marked by surface structures provided on the surface of the shaft 4 and/or on the inside surface of the bearing sleeve 3 located opposite the shaft 4. As soon as the rotor 5, and thus the bearing sleeve 3, is set in rotation, hydrodynamic pressure is built up in the bearing gap 7 or in the lubricant found in the bearing gap due to the surface structures, so that the bearing can then support a load.

In the region of the free end of the shaft 4, the bearing sleeve 3 is sealed by a specially designed cover plate 9 which is preferably arranged in an annular recess in the bearing sleeve 3. The cover plate 9 has a cylinder-shaped shoulder 10 arranged concentric to the rotational axis 12, the shoulder 10 being rotatably accommodated in a recess 15 in the end face of the shaft 4 in such a way that the bearing gap continues to run between the inner surface of the recess 15 and the outer surface of the shoulder 10 in the form of bearing gap 7'. This means that when the spindle motor is in operation, the shoulder 10 rotates within the recess in the shaft 4. Moreover, the cover plate 9 is provided with a central thread 11 to receive a fastening screw (not illustrated).

The end faces of the shaft 4 or of the shaft recess 15, that is the surfaces running perpendicular to the rotational axis 12, together with the end faces of the cover plate 9 and the shoulder 10, form the axial bearing regions 13, 13' (hydrodynamic thrust bearings). Parts of the appropriate surfaces of the axial bearing regions 13, 13' can preferably be provided with a surface structure.

What is more, the sleeve surfaces of the shaft recess running concentric to the rotational axis 12 together with the circumferential surfaces of the shoulder 10 located opposite them can additionally form radial bearing regions 14.

Figure 2:
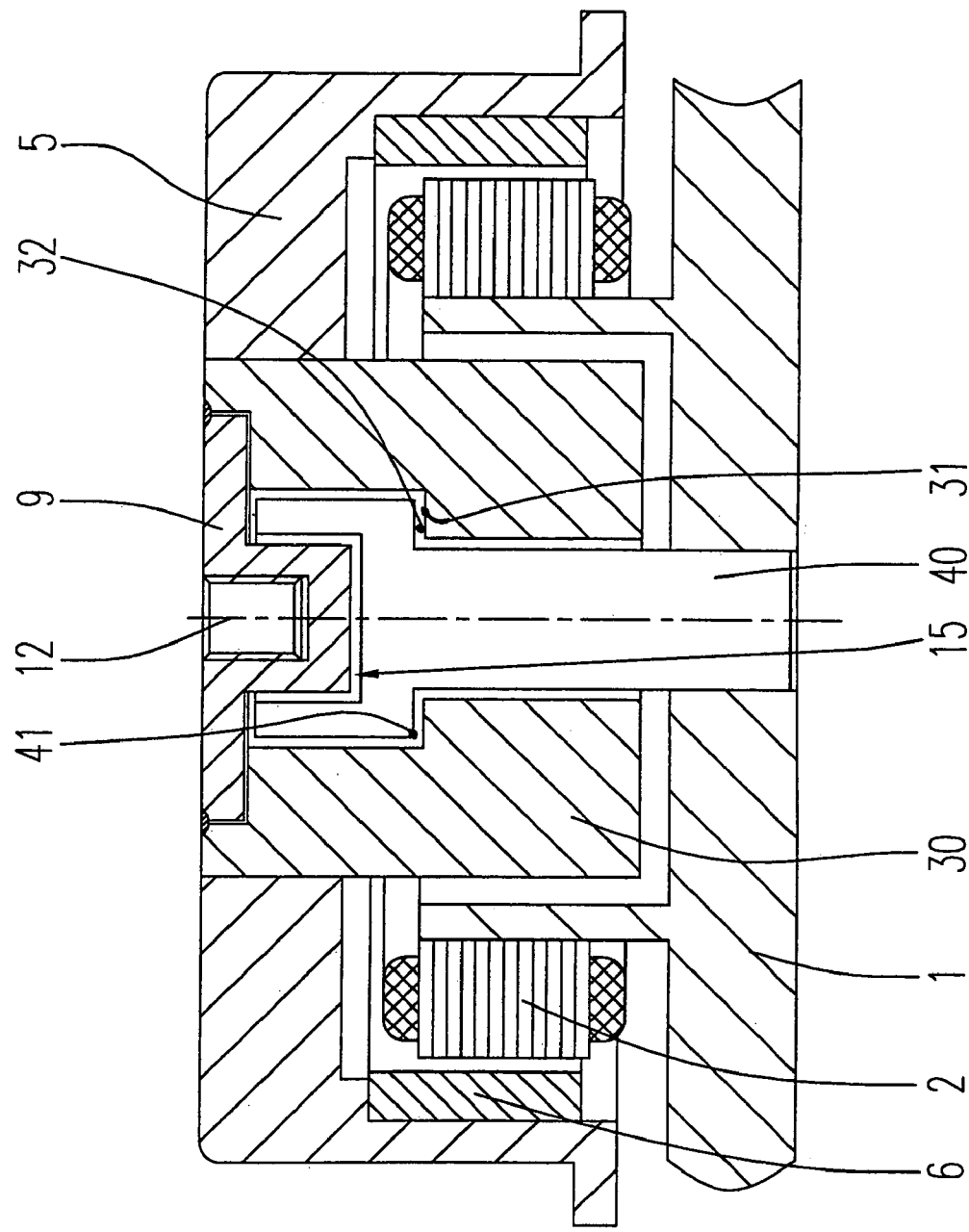
FIG. 2: a schematic sectional view of a spindle motor having a second embodiment of the bearing system according to the invention.

In contrast to FIG. 1, FIG. 2 shows an embodiment of the invention in which the shaft 40 has a step 41 about half way along its length. The step 41 divides the shaft 40 into a section having a larger diameter and a section having a smaller diameter, the recess to receive the shoulder 10 of the cover plate 9 being provided at the end face of the section having the larger shaft diameter.

Correspondingly, the bearing sleeve 30 also has a step 31 divided into a section having a larger inside diameter and a section having a smaller inside diameter, the step 31 being separated by the bearing gap 7 from the step 41 in the shaft 40 located opposite.

At least one of the two opposing surfaces of the steps 31 or 41 can be provided with a surface structure so that an additional axial bearing region 32 is formed.

Identification Reference List

1 Baseplate
2 Stator arrangement
3 Bearing sleeve
4 Shaft
5 Rotor hub
6 Permanent magnet
7 Bearing gap 7'
8 Radial bearing region 8'
9 Cover plate
10 Shoulder
11 Thread
12 Rotational axis
13 Axial bearing region 13'
14 Radial bearing region
15 Recess
30 Bearing sleeve
31 Step
32 Axial bearing region
40 Shaft
41 Step

The invention claimed is:

1. A hydrodynamic bearing system for the rotary bearing of a spindle motor to drive the platter(s) in a hard disk drive having a stationary shaft (4; 40), a bearing sleeve (3; 30) journaled to be rotatable about the axis of the shaft and a cover plate (9) fixedly attached to the bearing sleeve to cover the bearing sleeve in the region of the free end of the shaft, the surfaces of the shaft, the bearing sleeve and the cover plate facing each other and spaced apart from each other by a bearing gap (7) forming at least one radial bearing region (8; 8') and at least one axial bearing region (13; 13'), characterized in that the cover plate (9) has a cylinder-shaped shoulder (10) concentric to the axis that is rotatably accommodated in a first recess (15) in the end face of the shaft (4; 40) in such a way that the bearing gap (7) continues between the surface of the first recess and the outer surface of the shoulder in the form of a bearing gap (7'), the cover plate (9) being accommodated in a second recess in the end face of the bearing sleeve (3; 30).

2. A hydrodynamic bearing system according to claim 1, characterized in that the cover plate (9) has a central thread (11) to receive a fastening screw.

3. A hydrodynamic bearing system according to claim 1, characterized in that regions of the surface of the first recess (15) in the shaft (4; 40) and/or regions of the outer surface of the shoulder (10) are provided with surface structures and form a radial bearing region (14) and/or an axial bearing region (13; 13').

4. A hydrodynamic bearing system according to claim 1, characterized in that the shaft (40) has a step (41) which divides it into a section having a larger diameter and a section having a smaller diameter, the first recess (15) in the shaft (40) being provided at the end face of the section having the larger shaft diameter.

5. A hydrodynamic bearing system according to claim 1, characterized in that the bearing sleeve (30) has a first step (31) which divides it into a section having a larger inside diameter and a section having a smaller inside diameter, the step (31) being separated by the bearing gap (7) from a second step (41) in the shaft (40) located opposite.

6. A hydrodynamic bearing system according to claim 5, characterized in that at least one of the opposing surfaces of the first step or the second step is provided with a surface structure so that an axial bearing region is formed.

\* \* \* \* \*